UNITED STATES PATENT OFFICE.

FREDERIC P. DEWEY, OF WASHINGTON, DISTRICT OF COLUMBIA, ASSIGNOR TO DEWEY ORE REDUCTION CORPORATION, OF VIRGINIA.

TREATING ARSENID ORES.

954,263.  Specification of Letters Patent.  Patented Apr. 5, 1910.

No Drawing.  Application filed October 18, 1906. Serial No. 339,523.

*To all whom it may concern:*

Be it known that I, FREDERIC P. DEWEY, citizen of the United States, residing at 1801 Summit Place, Washington, District of Columbia, have invented certain new and useful Improvements in Treating Arsenid Ores, of which the following is a specification.

My invention relates to the metallurgical and chemical treatment of arsenid ores and particularly to argentiferous arsenid ores.

It is well known that when silver ores carrying arsenic are roasted in the ordinary way there is a heavy loss of silver carried away with the arsenious acid produced by the roasting, and when such ores as those of the Timiskaming district of Canada, carrying up to 50 or 60% of arsenic and up to several thousand ounces of silver per ton, besides cobalt and nickel, are roasted in the ordinary way the loss of silver is enormous.

My process is especially designed for roasting these Timiskaming ores, without loss of silver and leaving the residue in excellent condition for further treatment to extract the metals it contains, but it may be applied to other materials, and I have succeeded in reducing the roasting loss of silver to less than one ounce of silver per ton of ore.

It is well known that in the ordinary roasting of ores containing arsenids some arsenic acid ($As_2O_5$) is formed but heretofore in such roasting every effort has been made to keep the amount of arsenic acid formed at the smallest amount possible and even when once it was formed it was often broken up again by reducing it to the volatile arsenious acid ($As_2O_3$) which was driven off from the roasted ore. Previous to my invention it had never been proposed to utilize this method of forming arsenic acid and no one had roasted arsenid ores for the purpose of forming the maximum amount of arsenic acid ($As_2O_5$). All previous roasting of arsenid ores has been for the purpose of removing the arsenic as completely as possible from the roasted ore in order to facilitate the extraction of the valuable metals the ore contained, while my roasting seeks to oxidize the arsenic beyond the arsenious condition as fully as I can for the definite purpose of retaining the largest quantity obtainable of the arsenic in the roasted ore in the form of arsenic acid ($As_2O_5$).

The chief requirement in the roasting of arsenids for the production of the maximum amount of arsenic acid is to keep the temperature of roasting sufficiently low. It is, of course, essential that there should be a liberal supply of air. After roasting the ore may carry from 15 to 30% of arsenic in the form of arsenic acid ($As_2O_5$), combined with the various metallic oxids in the roasted ore, as metallic arsenates.

The essential element of my process consists in maintaining a very low temperature during the roasting. I have discovered that the arsenic begins to oxidize considerably below the melting point of lead, and when this oxidation sets in the greatest danger lies in its developing too much heat for the successful conduct of the operation and it may even be necessary to reduce the supply of external heat in order to prevent a too rapid rise in temperature. When the copious evolution of arsenious acid begins to abate the heat may be gradually increased, but the temperature should not be allowed to much exceed 600 degrees C. The following is a record of roasting 100 grams of ore carrying 2700 oz. of silver per ton, 58% arsenic, 11% cobalt, 4% nickel, in a gas heated muffle. Starting with a cold furnace and a low gas flame, $As_2O_3$ began to come off in 17 minutes, in about an hour, lead melted in a small scorifier back of the charge and red spots began to appear in the ore, in order to keep the temperature down the ore was stirred vigorously, in about half an hour the reaction slackened, in about three quarters of an hour longer, the charge became very faintly red and in another three quarters of an hour the charge was removed, having been three hours and eight minutes in the furnace, and at the close zinc was just thoroughly melted in a small scorifier in front of the charge. This method of roasting possesses many advantages, among which may be mentioned the following:— There is practically no loss of silver by volatilization, carefully conducted experiments on 50 to 100 lb. charges show a loss of less than one ounce of silver per ton of ore. The silver is left in a condition insoluble in dilute sulfuric acid which is of great advantage in the treatment of the very rich ores. While much of the arsenic is driven off from the ore and volatilized as arsenious acid, a large amount of the arsenic is oxidized beyond the volatile arsenious condition and is converted into the nonvolatile arsenic condition and remains in the roasted ore in the form of arsenic acid combined with bases as arsenates and for this reason, I call this an arsenate roast. As the temperature of roasting is so low the fumes can be drawn off by a fan and passed immediately into cloth bags for collecting the arsenious acid, which is thus obtained at once in merchantable form as a very fine white powder.

On treating the roasted ore with sulfuric acid, the arsenates and various other compounds pass into solution leaving the silver with the silicious residue which is practically free from cobalt and nickel. The silver can be easily recovered from this residue by various ordinary means, while the cobalt and nickel may be recovered from the solution in the usual way. When, however, the ore contains a large amount of calcite it may be better to treat the roasted ore with hydrochloric acid, which results in the formation of some insoluble chlorid of silver. In the claims the words ores and ore are used to cover artificial arsenids as well as the native minerals.

What I claim as new and valuable is:

1. The process of treating arsenid ores which consists in subjecting the ores to an arsenate roast, treating the roasted ore with acid and recovering the metals from the solution; substantially as described.

2. The process of treating argentiferous arsenid ores which consists in oxidizing the ore for the formation of metallic arsenates and separating the metallic arsenates from the silver, substantially as described.

3. The process of treating argentiferous arsenid ores which consists in oxidizing the ore for the formation of metallic arsenates, separating the metallic arsenates from the silver and recovering the metals, substantially as described.

4. The process of treating argentiferous arsenid ore which consists in roasting the ore at a low temperature, without volatilizing the silver, volatilizing a portion of the arsenic as arsenious acid, recovering the arsenious acid as a fine white powder and converting a portion of the arsenic into metallic arsenates, substantially as described.

5. The process of treating arsenid ores, which consists in roasting at a low temperature, volatilizing a portion of the arsenic as arsenious acid, collecting the arsenious acid in cloth bags as a powder and converting a portion of the arsenic into arsenates; substantially as described.

6. The process of treating argentiferous arsenid ores which consists in oxidizing the arsenic without volatilizing the silver; substantially as described.

7. The process of treating argentiferous arsenid ores which consists in oxidizing the arsenic and leaving the silver insoluble in dilute sulfuric acid; substantially as described.

8. The process of treating argentiferous arsenid ores which consists in oxidizing the arsenic by roasting the ore at a low temperature without volatilizing the silver and leaving the silver insoluble in sulfuric acid, substantially as described.

9. The process of treating argentiferous arsenids which consists in oxidizing the arsenic for the formation of arsenic acid and leaving the silver insoluble in dilute sulfuric acid, substantially as described.

10. The process of treating argentiferous arsenids which consists in oxidizing the arsenic for the formation of arsenic acid without volatilizing the silver and leaving the silver insoluble in dilute sulfuric acid, substantially as described.

11. The process of treating argentiferous arsenids which consists in oxidizing the arsenic for the formation of arsenic acid without volatilizing the silver, substantially as described.

12. The process of treating argentiferous arsenid ores, which consists in subjecting the ores to an arsenate roast, treating the roasted ore with acid and recovering the silver from the residue; substantially as described.

13. The process of treating argentiferous arsenid ores, which consists in subjecting the ores to an arsenate roast, treating the roasted ore with acid and recovering the metals from the solution; substantially as described.

14. The process of treating argentiferous arsenid ores, which consists in subjecting the ores to an arsenate roast, treating the roasted ore with acid, recovering the silver from the insoluble residue and metals from the solution; substantially as described.

15. The process of treating arsenids which consists in oxidizing the arsenid for the formation of arsenic acid, treating the roasted material with acid, filtering and recovering the metals from the solution, substantially as described.

16. The process of treating arsenids which consists in oxidizing the arsenid for the formation of arsenic acid with volatization of a portion of the arsenic as arsenious acid, condensing the arsenious acid as a fine white powder, recovering this powdered arsenious acid, treating the roasted material with acid, filtering and recovering the metals from the solution, substantially as described.

17. The process of treating arsenids which consists in roasting the arsenid at a low temperature for the formation of metallic arsenates, condensing the arsenious acid simultaneously volatilized as a fine white powder, collecting this powdered arsenious acid in bags, treating the roasted material with acid, and recovering the metals from the solution, substantially as described.

18. The process of treating argentiferous arsenids which consists in roasting the arsenid at a low temperature for the formation of metallic arsenates, condensing the arsenious acid simultaneously volatilized as a fine white powder, collecting this powdered arsenious acid in bags, treating the roasted material with acid, recovering the metals from the solution, and recovering the silver from the residue, substantially as described.

In testimony whereof I affix my signature in presence of two witnesses.

FREDERIC P. DEWEY.

Witnesses:
RICHARD R. BRIGHT,
FRANK S. BRIGHT.